Patented Feb. 3, 1925.

1,525,272

UNITED STATES PATENT OFFICE.

WILLIAM A. DARRAH, OF CHICAGO, ILLINOIS.

EXTRACT AND METHOD OF MAKING SAME.

No Drawing.   Application filed June 28, 1921.   Serial No. 481,106.

*To all whom it may concern:*

Be it known that I, WILLIAM A. DARRAH, a citizen of the United States, residing at Chicago, in the county of Cook and State of Illinois, have invented a new and useful Improvement in Extracts and Methods of Making Same, of which the following is a specification.

This invention relates to extracts or concentrates as used for beverages, food stuffs, flavorings, perfumes and allied purposes.

Some of the objects of this invention are to provide a concentrated extract which will have excellent keeping properties, and retain to the fullest extent the original delicious flavors or odors of the products from which it is made. It is also desired to produce a material which is readily soluble in common solvents. Many other objects will be apparent from a perusal of the following specification.

This invention may be applied to the preparation of extracts of such materials as teas of all kinds, coffee, cocoa, cloves, lemon, oranges. ginger and practically all other flavoring materials as well as roots of vegetables, etc. The process may also be applied to a concentration of odoriferous materials for use in the preparation of perfume and allied products.

This invention is particularly adapted to the formation of concentrates to be used in beverages as, for example, tea, coffee, etc., and in order to readily illustrate one specific application of this invention. the formation of a tea concentrate will be here described. It should be distinctly understood, however, that tea is merely chosen for the purpose of illustration and by making simple modifications, the fundamental process may be applied to many other materials, including those listed above.

The applicant is aware that many attempts have been made to concentrate such beverages as teas, coffees, etc., but in most cases, these attempts have proven unsuccessful for a number of reasons. As far as the applicant is aware, it has hitherto been impossibe to preserve in the extract all of the delicate flavors of the original material, with the result that the beverage produced by dissolving the beverage in water (or other solvent) has tasted flat, unnatural, and unattractive. Another difficulty which has been encountered in practically all extracts of this kind has been the rapid deterioration of the extract usually due to chemical or bacteriological changes. The product produced by this invention overcomes these and other changes. It is a matter of fact that the flavor of such materials as teas, coffees, etc. is due to a number of complicated compounds having widely differing characteristics, thus among the ingredients which produce the delicate flavors of tea or such compounds are essential oils, esters, alcohols, proteins and miscellaneous other chemical compounds. Some of these materials are relatively volatile while some are extremely involatile. Some are readily soluble in water while others only dissolve with difficulty. Many of these materials are readily oxidized by the air. There are also complicated interactions between many of these compounds when they stand in a mixed water solution for an appreciable period. These compounds (particularly nitrogen carrying compounds) are very susceptible to bacteriological action.

It will, therefore, be apparent that in order to preserve the original, delicate flavor of the material to be extracted, it is necessary to remove all of the necessary ingredients in approximately their proper proportion and to hold them in some form of suspension which will reduce oxidation and chemical interaction to a minimum. It should also be clearly kept in mind that many of the ingredients which lend flavor to such materials as teas, coffees, etc. are of a colloidal nature and, therefore, follow the laws of colloidal material.

I have found that by using that class of materials which includes the glycols, glycerol and related bodies, it is possible to form a colloidal solution of the necessary ingredients in the proper proportion to extremely and accurately reproduce the flavor of the original material and yet give a concentrated extract having excellent keeping properties.

In the case of preparing a tea extract, I have found that excellent results may be secured by first grinding and drying the leaves to a relatively fine powder. The particular function of the grinding is to increase the speed and thoroughness of the extraction as well as permitting the use of somewhat lower temperatures. It is possible, of course, to make satisfactory extractions without any grinding whatever.

After the material has been ground an equal amount, by volume, of glycerine, glycol or related compounds should be added and thoroughly mixed until the ground powder is entirely wetted. The mixture may then be placed in a water bath and heated preferably for a period of from thirty (30) minutes to several hours at a temperature of approximately 212 degrees Fahrenheit.

In the case of some materials, it is desirable to add a portion of water to the glycol or glycerine. In the case of Oolong tea, it is advantageous to use equal volumes of commercial glycerine and water. I do not wish to be restricted to this particular formula, however, or to the temperature given herein as various materials will require different temperatures and different proportions of the extracting ingredients. After the addition of the water, the mixture should be further heated, at about the same temperature, for a varying period which may likewise run from a few minutes to several hours depending upon the nature of the material to be extracted and the results which it is desired to accomplish. For example, in the case of preparing an extract of Oolong tea, excellent results are secured by boiling for a period of one hour before the addition of the water and further boiling for one hour after the addition of water. A lesser period of boiling after the addition of water reduces the amount of tannin in the extract and also modifies the flavor. I have found that each tea requires individual study of the conditions necessary to getting the best results but having once determined these conditions, it is relatively easy to duplicate the extractions.

After the addition of the water and subsequent heating, the material is filtered and bottled and is then ready for use. In the case of extracts made from Oolong tea, I have found one teaspoonful of extract made in accordance with the methods described above will give a somewhat stronger concentrate than one and one-half teaspoonsful of tea leaves when both materials are added to the same amount of water.

An extract prepared as here described will keep indefinitely, largely because of the viscous colloidal nature of the solvent itself; in other words, it appears that glycerine which is an excellent solvent for both oils and esters and alcohols, very materially retards chemical inter-action between these various ingredients and also reduces oxidation to a minimum. This material also has the property of holding in suspension those colloidal and insoluble materials which are extracted in the course of the process but which tend to precipitate out of a water solution.

It is, of course, apparent that glycerine is not readily susceptible to the reaction of ordinary bacteria and even acts as a preservative in protecting the dissolved and suspended matter.

I have applied this process to the extraction of flavor from Ceylon, Oolong, Congou, Pekoe and India teas and many other varieties, as well as coffees, cloves, ginger, lemon, orange and many other substances. While glycerine appears to be the most available commercial substance, yet, I have found that many of the glycols and other members of this group are equally applicable. It is even possible to add to these materials glucose, or to use glucose independently in which case it appears to function similarly to glycerol both as a solvent and as a protective medium.

It is feasible to remove the water which has been added to the solution in the course of extracting water-soluble materials by a subsequent evaporation, and this step may or may not be employed depending upon the degree of concentration desired.

It will be evident that in extracting the delicate flavoring compounds by this process, since the material is at all times completely surrounded by glycerol (or other solvent), those relatively volatile materials, such as the essential oils, are trapped and dissolved in the solvent before they can evaporate. It is also entirely feasible to carry out this process in a closed vessel in case one is dealing with extremely volatile materials. In preparing an extract of cloves, the use of a closed vessel is advantageous. In the case of extracting most teas, a closed vessel is unnecessary. Some highly fermented teas (such as Congou) give somewhat better results when the extraction is carried out in a closed container.

In treating some materials it is desirable to add a small amount of moisture before adding the glycerol. This seems to be particularly advantageous in the case of certain highly fermented teas such as Pekoe, India and some of the black teas. On the other hand in the case of Oolong and Ceylon there appears to be no particular advantage in adding water before adding glycerine.

I have so found that the addition of water has a tendency to increase the extraction of the tannin and makes the resultant concentrate somewhat stronger in taste. However, in the case of some of the milder flavored teas this is decidedly advantageous.

I have found that the glycerol may be added either hot or cold depending upon the material to be extracted.

In the case of most teas better results seem to be obtained when the glycerol is previously heated to the boiling point of water before being added to the tea. Such treatment naturally reduces the time of extraction and appears to help retain the delicate flavor.

On the other hand in the treatment of other materials as for example coffee, it appears to be more satisfactory to add the extracting solvent at room temperature and raise the mixture to the boiling point of water or appreciably above this temperature. I have found in some cases that it is of advantage to take an under roasted coffee and actually complete a portion of the roasting in the solvent during the process of extraction. This is possible because of the high boiling point of the solvent particularly if under a slight increased pressure.

I have found by experience that an extraction of the distinctive ingredients in such materials as teas, coffees, etc., is surprisingly complete and permanent when made in the manner and with the materials described above. In the case of tea and coffee not only are the distinctive flavorings and odoriferous principals quite perfectly extracted, but the caffeine and theine are removed to a large extent. It is of course well known that glycerine has excellent solvent properties but the results of my experiments have indicated that the extent to which glycerine may act as a solvent is probably very little understood. It is of course probable that many of the materials extracted enter into colloidal solution and the viscous nature of the solvent materially assists in maintaining the solution. That is, the viscous characteristics prevent the precipitation of the colloids which would take place in a simple aqueous solution.

I have found that tannin is readily soluble in glycerine and it is my opinion based on a series of experiments that the tannin acts as a dispersing agent materially assisting in maintaining the colloidal solution. I have even found it of advantage in some cases to add small amounts of tannin or other dispersing agent in case the material to be extracted does not contain dispersing agents. I have also found that because of the viscous nature of the solvent it is usually advisable to agitate the mixture of the material to be extracted and the solvent during the process of extraction. It appears from my tests that such agitation materially hastens the solution of the desired ingredients.

The extract which is produced by the process described herein is readily soluble in either hot or cold water, milk or other ordinary solvents. The solution when dissolved in water is not only palatable but retains almost undiminished the original flavor and odor of the material extracted. In the case of extracts made from teas or coffee, the solution contains the stimulating caffeine or theine with the results that the drink made by dissolving this solution in either hot or cold water is practically identical with that produced from tea or coffee in the ordinary commercial manner. One particular field of this invention therefore is the production of a concentrated extract which may be used as a beverage.

I have found that when an extraction is made by finally grinding the material to be extracted as for example tea, and heating with boiling water for from 10 to 30 minutes, a brown colored, muddy liquid is produced which does not keep well and which has a marked tendency to deposit a precipitate. On adding a small percentage of glycerine, a glycol or related product, the solution immediately becomes much darker in color and the tendency to precipitate is materially reduced. The solution also has the property of keeping unchanged indefinitely. It appears to be necessary to add the glycerine or other dispersing agent as promptly as possible after the formation of the water solution. I have found that in the case of India tea as little as 5% by weight of glycerine produces a marked darkening of the color. 15 to 18% of glycerine appears to impart very desirable stability to the solution while the addition of 25% by weight of glycerine still further increases the stability of the solution but appears to impart a very noticeable sweetness to the taste of the mixture.

Having now fully described my invention, what I claim as new and wish to secure by Letters Patent in the United States, is as follows:—

1. The process of making extractions of edible vegetable products, which consists in first mixing the product to be treated with glycerol at a controlled temperature, second, heating for a given time, and third, filtering off the soluble portions.

2. The process of making extractions of edible vegetable products, which process consists in first grinding the material to be treated, second, moistening said material, third, adding a glycerol, fourth, heating to a controlled temperature and agitating, adding a portion of water and agitating and removing the soluble material.

3. The process of making an extraction of edible vegetable products, which consists in first grinding the material to be treated, second, adding warm glycerol, third, heating and agitating the mixture, fourth, adding a portion of water, and lastly, removing the soluble matter by filtration.

4. A flavoring extract comprising a solution of flavoring ingredients of vegetable material such as coffee or tea in water containing glycerine to the extent of not more than 30%.

5. An extract of tea consisting of the essential constituents dissolved in a glycerine solution.

WILLIAM A. DARRAH.